US011048725B2

(12) United States Patent
Schukovets et al.

(10) Patent No.: US 11,048,725 B2
(45) Date of Patent: Jun. 29, 2021

(54) METHODS AND SYSTEMS FOR UNIFIED DATA SOURCES

(71) Applicant: SAP SE, Walldorf (DE)

(72) Inventors: Igor Schukovets, Mannheim (DE); Erich Schulzke, Heidelberg (DE); Gregor Tielsch, Ilvesheim (DE); Nils Hartmann, Heidelberg (DE)

(73) Assignee: SAP SE, Walldorf (DE)

( * ) Notice: Subject to any disclaimer, the term of this patent is extended or adjusted under 35 U.S.C. 154(b) by 573 days.

(21) Appl. No.: 15/658,614

(22) Filed: Jul. 25, 2017

(65) Prior Publication Data

US 2019/0034511 A1   Jan. 31, 2019

(51) Int. Cl.
*G06F 16/28* (2019.01)
*G06F 16/22* (2019.01)

(52) U.S. Cl.
CPC ........ *G06F 16/283* (2019.01); *G06F 16/2282* (2019.01)

(58) Field of Classification Search
None
See application file for complete search history.

(56) References Cited

U.S. PATENT DOCUMENTS

| | | | | |
|---|---|---|---|---|
| 6,629,102 B1* | 9/2003 | Malloy | | G06F 16/284 |
| 7,676,522 B2* | 3/2010 | Klein | | H04L 43/022 |
| | | | | 707/803 |
| 7,739,224 B1* | 6/2010 | Weissman | | G06F 16/283 |
| | | | | 707/794 |
| 8,429,179 B1* | 4/2013 | Mirhaji | | G06F 17/274 |
| | | | | 707/756 |
| 10,423,633 B2* | 9/2019 | Mirhaji | | G06F 40/211 |
| 10,635,686 B2* | 4/2020 | Wan | | G06F 16/254 |
| 2003/0172091 A1* | 9/2003 | Norcott | | G06F 16/2358 |
| 2004/0139061 A1* | 7/2004 | Colossi | | G06F 16/283 |
| 2004/0236767 A1* | 11/2004 | Soylemez | | G06F 16/283 |
| 2007/0027904 A1* | 2/2007 | Chow | | G06F 16/2452 |
| 2009/0287737 A1* | 11/2009 | Hammerly | | G06F 16/288 |
| 2010/0198777 A1* | 8/2010 | Lo | | G06F 16/283 |
| | | | | 707/601 |
| 2011/0125705 A1* | 5/2011 | Aski | | G06F 16/254 |
| | | | | 707/602 |
| 2012/0084250 A1* | 4/2012 | Gundorov | | G06F 16/23 |
| | | | | 707/600 |
| 2014/0310232 A1* | 10/2014 | Plattner | | G06F 16/24539 |
| | | | | 707/602 |
| 2015/0347484 A1* | 12/2015 | Klauke | | G06F 16/2282 |
| | | | | 707/607 |
| 2017/0109386 A1* | 4/2017 | Baer | | G06F 16/2282 |

* cited by examiner

*Primary Examiner* — Christopher J Raab
(74) *Attorney, Agent, or Firm* — Buckley, Maschoff & Talwalkar LLC

(57) ABSTRACT

A system, method, and computer-readable medium, to access an On-line Transaction Processing (OLTP) data source, the OLTP data source including a plurality of tables; extend the OLTP data source by adding at least one new attribute to at least one of the plurality of tables; define at least one calculated property for at least one of the plurality of tables, the at least one calculated property to be calculated during a runtime analysis of the OLTP data source having the at least one new attribute and the defined calculated property; and persist the OLTP data source having the at least one new attribute and the defined calculated property in a memory.

15 Claims, 6 Drawing Sheets

600

```
┌─────────────────────────────────────────────┐
│   ACCESS AN ON-LINE TRANSACTION PROCESSING  │
│   (OTLP) DATA SOURCE, THE OTLP DATA SOURCE  │
│        INCLUDING A PLURALITY OF TABLES      │
│                                         605 │
└─────────────────────────────────────────────┘
                      │
                      ▼
┌─────────────────────────────────────────────┐
│    EXTEND THE OTLP DATA SOURCE BY ADDING AT │
│     LEAST ONE NEW ATTRIBUTE TO AT LEAST ONE │
│           OF THE PLURALITY OF TABLES        │
│                                         610 │
└─────────────────────────────────────────────┘
                      │
                      ▼
┌─────────────────────────────────────────────┐
│      DEFINE AT LEAST ONE CALCULATED PROPERTY│
│    FOR AT LEAST ONE OF THE PLURALITY OF     │
│    TABLES, THE AT LEAST ONE CALCULATED      │
│    PROPERTY TO BE CALCULATED DURING A       │
│    RUNTIME ANALYSIS OF THE OLTP DATA SOURCE │
│    HAVING THE AT LEAST ONE NEW ATTRIBUTE    │
│    AND THE DEFINED CALCULATED PROPERTY      │
│                                         615 │
└─────────────────────────────────────────────┘
                      │
                      ▼
┌─────────────────────────────────────────────┐
│    PERSIST THE OLTP DATA SOURCE HAVING THE  │
│   AT LEAST ONE NEW ATTRIBUTE AND THE DEFINED│
│      CALCULATED PROPERTY IN A MEMORY        │
│                                         620 │
└─────────────────────────────────────────────┘
```

*FIG. 6*

METHODS AND SYSTEMS FOR UNIFIED DATA SOURCES

BACKGROUND

Information technology systems might generally be divided into transactional (On-Line Transactional Processing, OLTP) systems and analytical (On-Line Analytical Processing, OLAP) systems. In general, OLTP systems use data sources for data warehouses that are analyzed by OLAP systems. The data sources of OLTP and OLAP systems are typically different and are further configured and optimized for each of the respective systems. Accordingly, systems and processes have been developed to transform data from an OLTP data structure to an OLPA data structure.

However, some OLTP to OLAP data transformations are complex and resource hungry. As such, some applications and other entities may have a desire and/or need for a technological tool to efficiently generate and implement a single data structure that may accommodate both OLTP and OLAP applications.

BRIEF DESCRIPTION OF THE DRAWINGS

FIG. 6 is an illustrative flow diagram for some example embodiments herein; and

DETAILED DESCRIPTION

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

Figure 1:
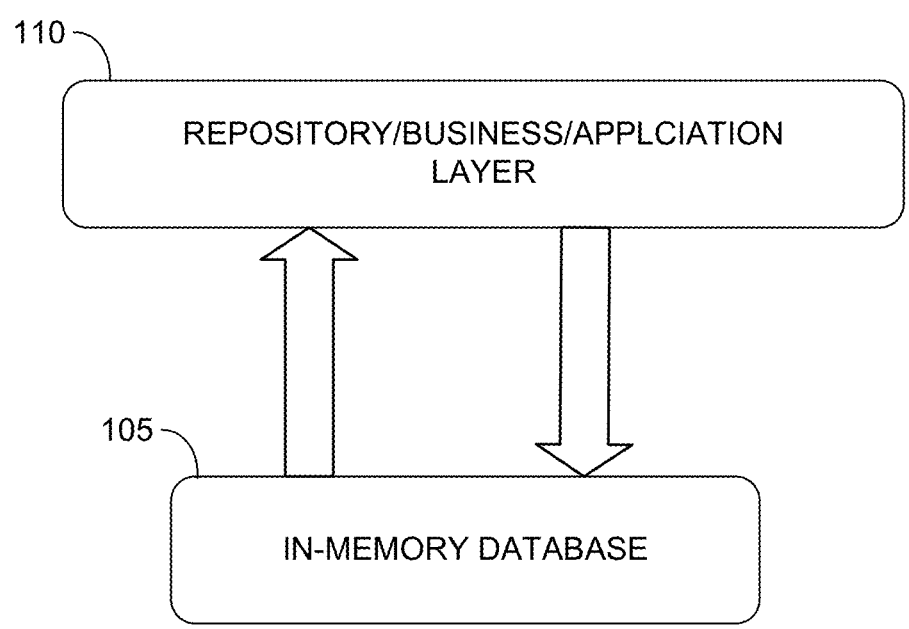
FIG. 1 is an illustrative logical architecture for a database system.

FIG. 1 is an illustrative block diagram of an architecture or system 100, in one example. Examples of some embodiments of the present disclosure are not limited to the particular architecture 100 shown in FIG. 1. System 100 includes an illustrative logical architecture for a database system including an in-memory database layer 105 and a repository, business, and application layer 110. All of the data is stored in database layer 105, where for system 100 all of the data is stored in-memory (e.g., in volatile (non-disk-based) memory such as, for example, Random Access Memory or RAM). The full database may be persisted in and/or backed up to fixed disks (not shown).

Accordingly, there is no need to transfer data between the database layer 105 and the repository, business, and application layer 110. Additionally, as system 100 stores all of the data in RAM, calculations can be performed at the database layer 105 instead of, for example, at the application layer.

In some embodiments, system 100 may include the SAP HANA in-memory database infrastructure (developed by the assignee hereof, SAP SE). In some embodiments, system 100 may include a feature referred to as calculated columns. As used herein, the calculated columns feature (e.g., as implemented in SAP HANA) resides in logic in database layer 105. As referred to herein, the calculated column feature can be invoked to add an additional column to a database table. The results for the calculated column can be calculated at runtime based on existing column(s) (e.g., from a database source table, another calculated column, etc.) and one or more functions, operators (e.g., logic operators, mathematical operators, etc.), input parameters, and constants. In some embodiments, a database instance including features and/or functions similar to the calculated column feature may be leveraged in accordance with other aspects of the present disclosure.

In some aspects, process executions by the database layer 105 (i.e., HANA), including the features thereof (e.g., calculated columns) are capable of being performed faster than traditional database systems that necessarily transfer data between the database layer and other layers (e.g., application layer).

In some embodiments herein, processes and systems might leverage technical aspects and features of an in-memory database infrastructure or framework to effectuate database authorization policies using column-based access controls.

Embodiments herein are not limited to an in-memory implementation of a database. For example, data may be stored in Random Access Memory (e.g., cache memory for storing recently-used data) and other forms of solid state memory and/or one or more fixed disks (e.g., persistent memory for storing their respective portions of the full database).

Figure 2:
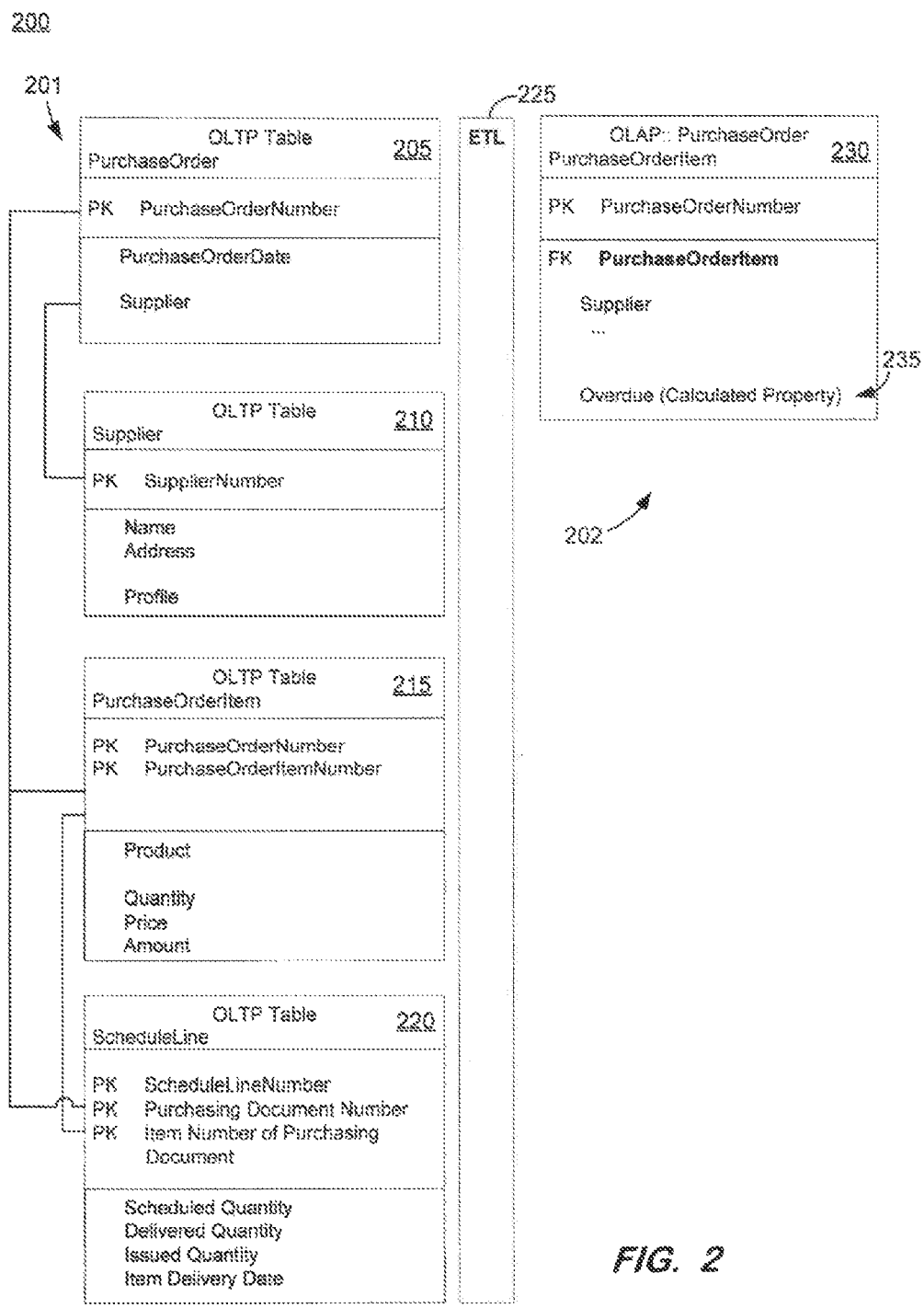
FIG. 2 includes illustrative examples of database tables.

FIG. 2 is an illustrative example of database tables 201 used to store transactional data that forms the source data for On-Line Transactional Processing (OLTP) functions and systems. The data structure(s) 201 are configured for transaction-oriented applications. Data tables 201 relate to a purchase order and include PurchaseOrder OLTP table 205 having a primary key of PurchaseOrderNumber and the attributes PurchaseOrderDate and Supplier; Supplier OLTP table 210 including information for suppliers; PurchaseOrderItem OLTP table 215 that includes information for each item on a purchase order (e.g., product, quantity, price, and amount); and ScheduleLine OLTP table 220 that includes information that describes, for each purchase order item, a scheduled quantity, a delivered quantity, an issued quantity, and an item delivery date, where there may be more than one delivery date for a particular item and more than one schedule line item for a particular purchase order item.

FIG. 2 further illustrates an example of an On-Line Analysis Processing data structure 202 corresponding to the OLTP data structure 201. OLAP data is configured for use and processing by OLAP applications. In some regards, some data and database systems traditionally stored data as OLTP data (e.g., 201). However, OLTP data 201 might need to be transformed to an OLAP data 202 configuration for use and processing by an OLAP application. An ETL (Extract, Transform, and Load) process 225 may be used to extract data from a source (e.g., OLTP data source 201), transforming the data by one or more operations, functions, and processes, and loading the data to an application (e.g., an OLAP application), a system (e.g., a database system or service), and repository (e.g., in-memory database 105 in FIG. 1). In the example of FIG. 2, ETL process 225 might operate to generate OLAP data 202 including data table 230. ETL process 225 may aggregate the data of OLTP data table 215 (i.e., PurchaseOrderItem) to generate a new calculated attribute or property "Overdue" as shown at 235, which can be used by an OLAP application to analyze and report desired attribute values.

While ETL process 225 provides a mechanism to transform an OLTP data source 201 into an OLAP data source 202, the ETL process and the two data sources depicted in FIG. 2 are not without their problems. For example, two data structures must be maintained (e.g., updated periodically to remain current), separate hardware is needed for each data source, and storing the two data sources consumes more stage resources than the OLTP data source alone.

Figures 3, 4:
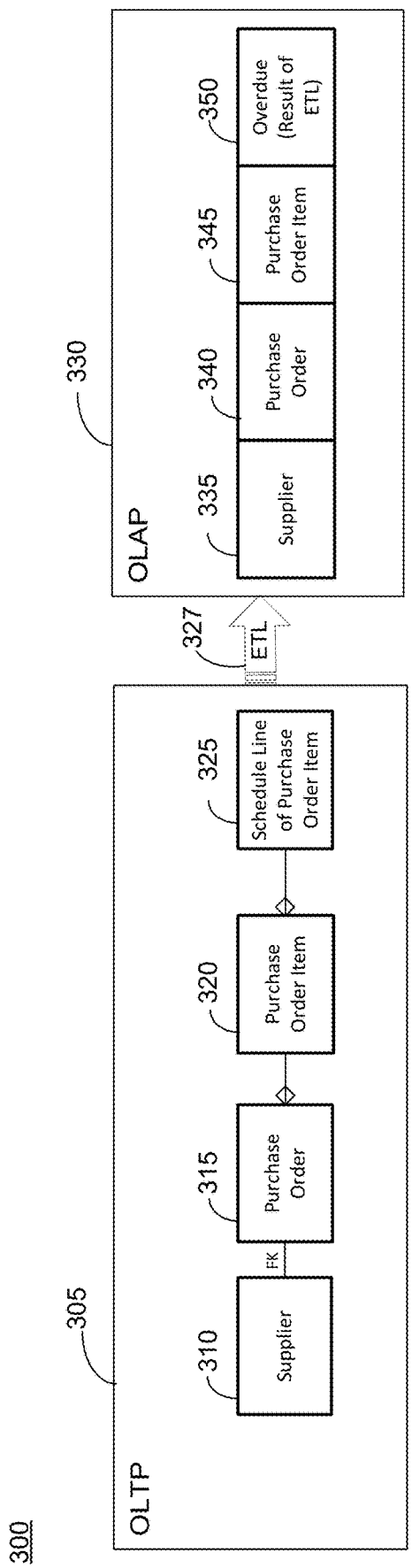
FIG. 3 is an illustrative example depicting two data sources and a transformation process therebetween.
FIG. 4 is an illustrative example depicting a unified data source and process herein.

FIG. 3 is an illustrative depiction of the classic solution for transforming an OLTP data source 305 to OLAP data source 330, wherein the OLAP data structure may be used by an OLAP application for analysis and reporting purposes. In some aspects, in order to do some analysis on the OLTP data 305, ETL step or process 327 performs a transformation to, for example, combine and/or aggregate the OLTP data to perform calculations on the attributes thereof. In FIG. 3, OLTP data 305 includes four entities or data tables. Supplier 310 and purchase order 315 are joined by a foreign key as illustrated. Attributes of the purchase order 315 are related to purchase order item 320 and attributes of purchase order item 320 are related to schedule line 325 of the purchase order item. ETL process or step 327 produces aggregated OLAP data 330 that includes some aspects of the OLTP data source, such as supplier 335, purchase order 340, and purchase order item 345. Additionally, OLAP data source 330 includes the "Overdue" calculated attribute 350.

The FIG. 3 example demonstrates how some of the OLTP data 305 is replicated for purposes of the OLAP data source 330 by the ETL process 327. Such data replication is costly from a memory storage perspective, particularly for an in-memory implementation (e.g., an in-memory database).

FIG. 4 is an illustrative example depicting some aspects and features of the present disclosure. Data structure 400, in general, extends an OLTP data structure and further defines a calculated property to obtain a single data structure that can function as an OLTP data source and an OLAP data source. FIG. 4 includes supplier 405 and purchase order 410 that are similar to the supplier 310 and purchase order 315 of FIG. 3. Data structure 400 further includes purchase order 415 and schedule line of purchase order item 420 that may be similar to the purchase order 320 and purchase order 325 of FIG. 3, respectively. Entities 405, 410, 415, and 420 exist, as seen by a comparison to the traditional data structures of FIG. 3. However, data structure 400 is changed from data structure 305 in that data structure 400 adds new fields to the existing OLTP data structure, as illustrated by the new persisted fields 425. The added fields 425 operate to extend the OLTP data source. The added field(s) 425 are added to ensure that a desired calculated property or attribute can be determined.

Data structure 400 further includes a new property or attribute at 430. The new attribute may be based on the newly introduced filed(s) 425 that further extend the OLTP data structure. In some aspects, the calculated property is defined by the data structure 400 (i.e., at a design time) and the values for the calculated property 430 are determined or otherwise calculated during a runtime or other utilization of data structure 400 (e.g., by an OLAP application or service).

Figure 5:
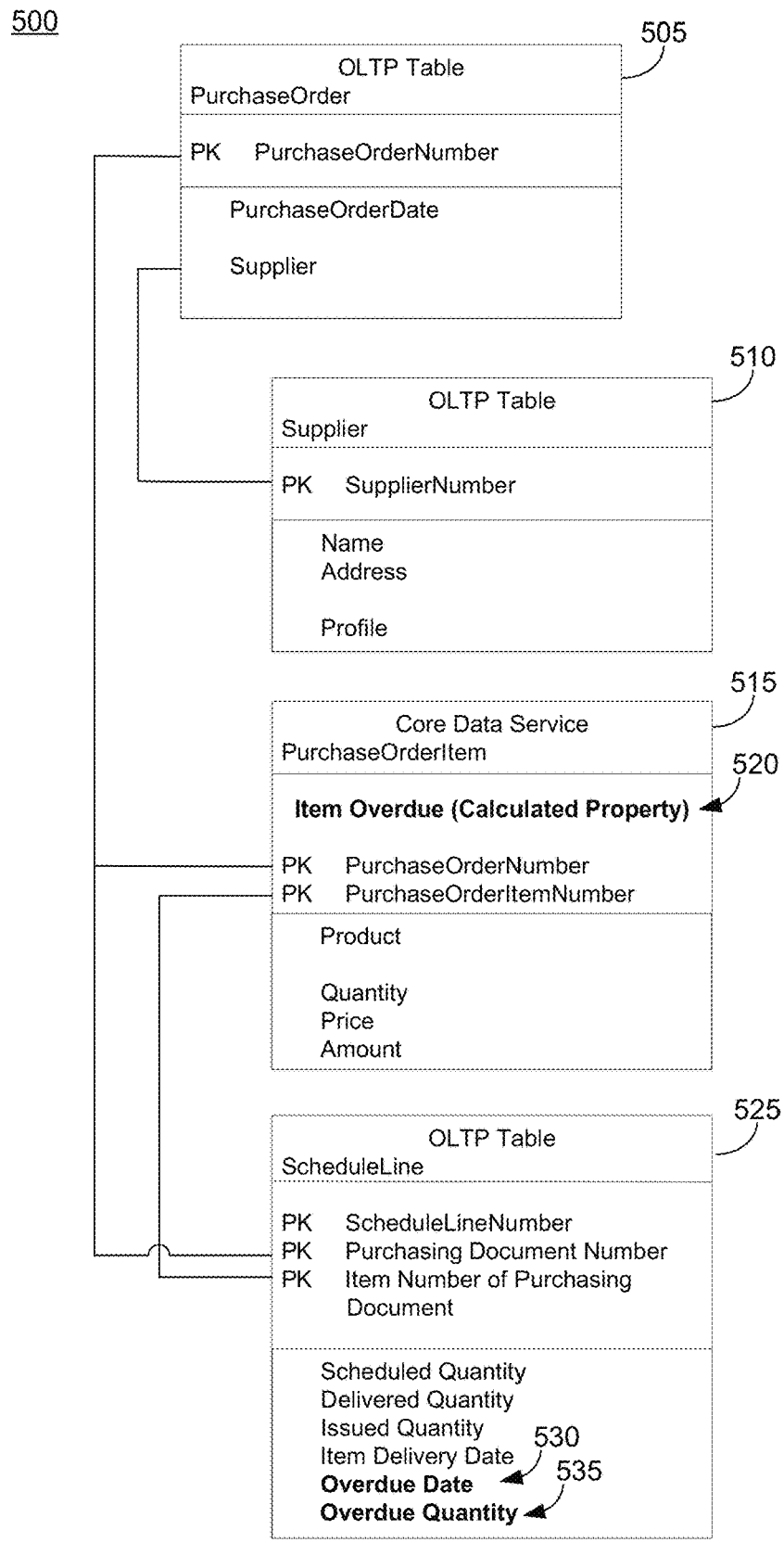
FIG. 5 is a depiction of illustrative examples of database tables herein.

FIG. 5 is an illustrative depiction of data tables for a data structure corresponding to some example embodiments herein. For example, the tables illustrated in FIG. 5 may correspond to the data structure introduced and described in FIG. 4. Tables 505 and 510 are the same or similar to the OLTP data tables shown in FIG. 2. However, FIG. 5 differs from the OLTP data structure in a number of ways. For example, OLTP table 525 is extended to include, in the present example, two additional (new) attributes—"Overdue Date" 530 and "Overdue Quantity" 535. These new attributes are added since additional information is needed to generated the desired calculated property 520 (e.g., "Item Overdue"). The value for calculated property 520 is determined based on the newly added attributes of "Overdue Date" 530 and "Overdue Quantity" 535. The table 515 including the "PurchaseOrderItem" may be referred to as a Core Data Service since, for example, it includes more than data but further includes a function or formula for calculating a value for the defined calculated property or attribute.

The value for the calculated property may be determined "on-the-fly" by an in-memory database system or application. As used herein, the term "on-the-fly" refers to functions, operations, and calculations performed during a runtime execution of an application where the values generated are not persisted in a memory but the underlying formula(s) and/or function(s) are instead persisted. In this manner, updates to the formulas or other defining aspects of the calculated property may be automatically accounted for in value calculations.

In the example of FIG. 5, the calculated property aggregates data from the ScheduleLine table and its value is calculated on-the-fly.

FIG. 6 is an illustrative flow diagram of a process, in accordance with some embodiments herein. While some aspects of FIG. 6 might be captured in some other portions herein, FIG. 6 relates to some embodiments (e,g., system, method, and medium) for a single data structure that unifies OLTP and OLAP features and can be used by OLTP and OLAP applications. At operation 605, OLTP data is accessed. The OLTP data may be accessed from a data store or memory or service or application. The OLTP data might be newly generated or previously generated for or by applications unrelated to an application or system performing process 600.

At operation 610, the OLTP data source is extended to include new attributes. The new attributes may be added to the data tables of the data source accessed at operation 605. More than one attribute may be newly added and the one or more attributes may be added to one or more of the tables comprising the OLTP source data.

At operation 615, at least one calculated property for at least one of the plurality of tables can be defined. The value for the at least one calculated property may actually be calculated during a runtime analysis of the extended OLTP data source (i.e., the OLTP data source having the at least one new attribute and the defined calculated property).

The result of the OLTP data source having the at least one new attribute and the defined calculated property may be saved in a memory in the form of a record or other data structure (e.g., database table) at operation 620. In some embodiments, the memory may be a persistent memory.

Figure 7:
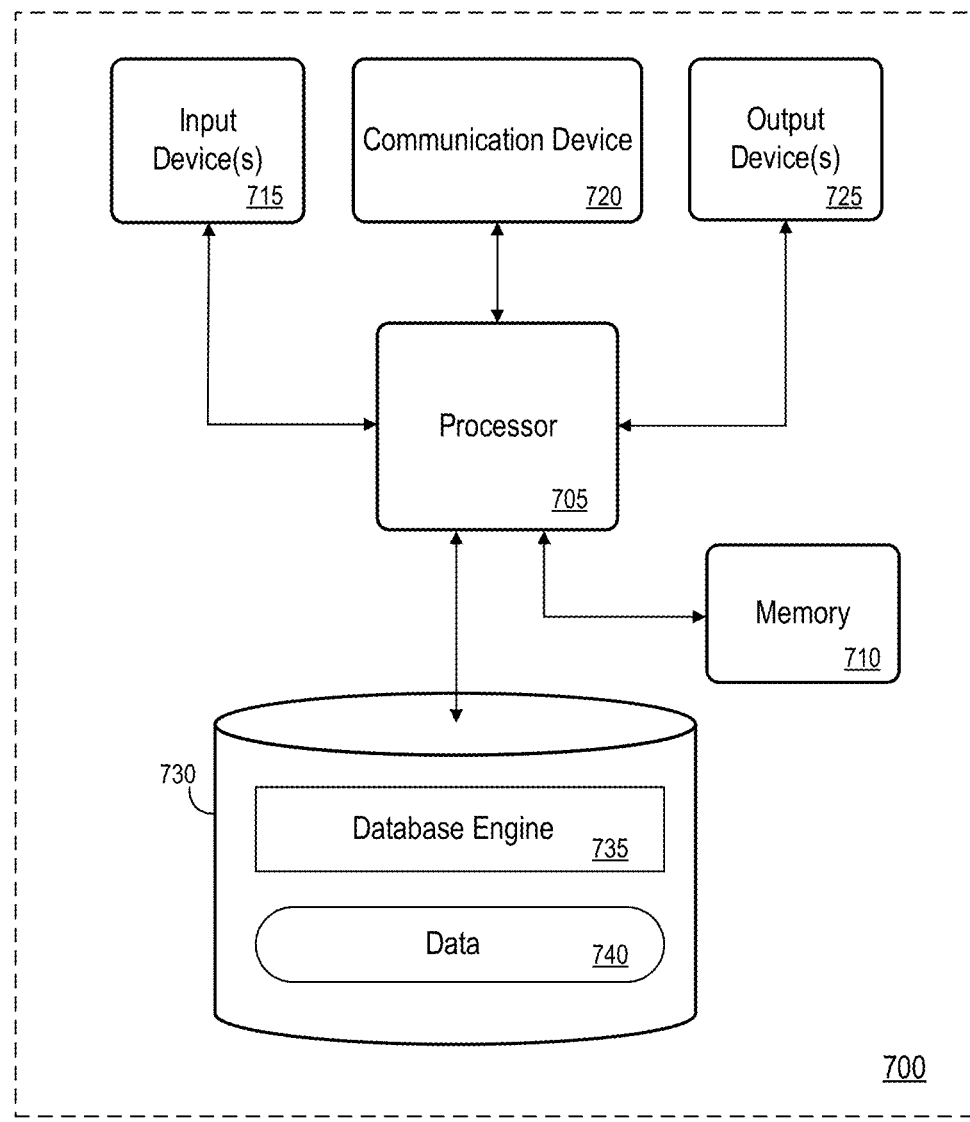
FIG. 7 is an example schematic diagram of a system in an embodiment herein.

FIG. 7 illustrates an exemplary system diagram for performing the processes described herein. Apparatus 700 includes processor 705 operatively coupled to communication device 720, data storage device 730, one or more input devices 715, one or more output devices 725 and memory 710. Communication device 720 may facilitate communication with external devices, such as a reporting client, or a data storage device. Input device(s) 715 may comprise, for example, a keyboard, a keypad, a mouse or other pointing device, a microphone, knob or a switch, an infra-red (IR) port, a docking station, and/or a touch screen. Input device(s) 715 may be used, for example, to enter information into apparatus 700. Output device(s) 725 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 710 may comprise Random Access Memory (RAM), Storage Class Memory (SCM) or any other fast-access memory.

Database engine 735 may comprise logic executed by processor 705 to cause apparatus 700 to perform any one or more of the processes described herein (e.g., 400 and 600). Embodiments are not limited to execution of these processes by a single apparatus.

Data 740 (either cached or a full database) may be stored in volatile memory such as memory 725. Data storage device 730 may also store data and other program code and instructions for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other platforms, frameworks, and architectures may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable instructions; and
   a processor to execute the processor-executable instructions to cause the system to:
   access an On-line Transaction Processing (OLTP) data source, the OLTP data source including a plurality of tables;
   extend the OLTP data source by adding at least one new attribute to a first one of the plurality of tables;
   define, at a design time, a function associated with a second one of the plurality of tables, the function being defined to determine a value for the function based on the at least one new attribute added to extend the OLTP data source;
   persist the extended OLTP data source including the at least one new attribute and the function in a memory;
   access, by an OLAP application, the persisted extended OLTP data source including the at least one new attribute and the function; and
   calculate, by an execution of the OLAP application during a runtime, the value for the function based on the at least one new attribute.

2. The system of claim 1, wherein the access of the persisted OLTP data source and the calculation of the value of the function occur during an analysis of the OLTP data source having the at least one new attribute and the function.

3. The system of claim 1, wherein the function is defined based on a database operation and the at least one new attribute.

4. The system of claim 3, wherein the database operation is an aggregation of data of a table including the at least one new attribute.

5. The system of claim 1, wherein the OLTP data source having the at least one new attribute and the function is to be used as a data source for an execution of an OLTP process.

6. A computer-implemented method, the method comprising:
   accessing, by a processor, an On-line Transaction Processing (OLTP) data source, the OLTP data source including a plurality of tables;
   extending, by the processor, the OLTP data source by adding at least one new attribute to a first one of the plurality of tables;
   defining, by the processor at a design time, a function associated with a second one of the plurality of tables, the function being defined to determine a value for the function based on the at least one new attribute added to extend the OLTP data source;
   persisting, by the processor, the extended OLTP data source including the at least one new attribute and the function in a memory; and
   accessing, by an OLAP application, the persisted extended OLTP data source including the at least one new attribute and the function; and
   calculating, by an execution of the OLAP application during a runtime, the value for the function based on the at least one new attribute.

7. The method of claim 6, wherein the access of the persisted OLTP data source and the calculation of the value of the function occur during an analysis of the OLTP data source having the at least one new attribute and the defined function.

8. The method of claim 6, wherein the defined function is defined based on a database operation and the at least one new attribute.

9. The method of claim 8, wherein the database operation is an aggregation of data of a table including the at least one new attribute.

10. The method of claim 6, wherein the OLTP data source having the at least one new attribute and the defined function is to be used as a data source for an execution of an OLTP process.

11. A non-transitory computer-readable medium storing program code, the program code executable by a processor of a computing system to cause the computing system to:

access an On-line Transaction Processing (OTLP) data source, the OLTP data source including a plurality of tables;
extend the OLTP data source by adding at least one new attribute to at least one of the plurality of tables;
define, at a design time, a function associated with a second one of the plurality of tables, the function being defined to determine a value for the function based on the at least one new attribute added to extend the OLTP data source;
persist the extended OLTP data source including the at least one new attribute and the function in a memory;
access, by an OLAP application, the persisted extended OLTP data source including the at least one new attribute and the function; and
calculate, by an execution of the OLAP application during a runtime, the value for the function based on the at least one new attribute.

12. The medium of claim 11, wherein the access of the persisted OLTP data source and the calculation of the value of the function occur during an analysis of the OLTP data source having the at least one new attribute and the defined at least one calculated property.

13. The medium of claim 11, wherein the defined function is defined based on a database operation and the at least one new attribute.

14. The medium of claim 13, wherein the database operation is an aggregation of data of a table including the at least one new attribute.

15. The medium of claim 11, wherein the OLTP data source having the at least one new attribute and the defined function is to be used as a data source for an execution of an OLTP process.

\* \* \* \* \*